Figure 1:
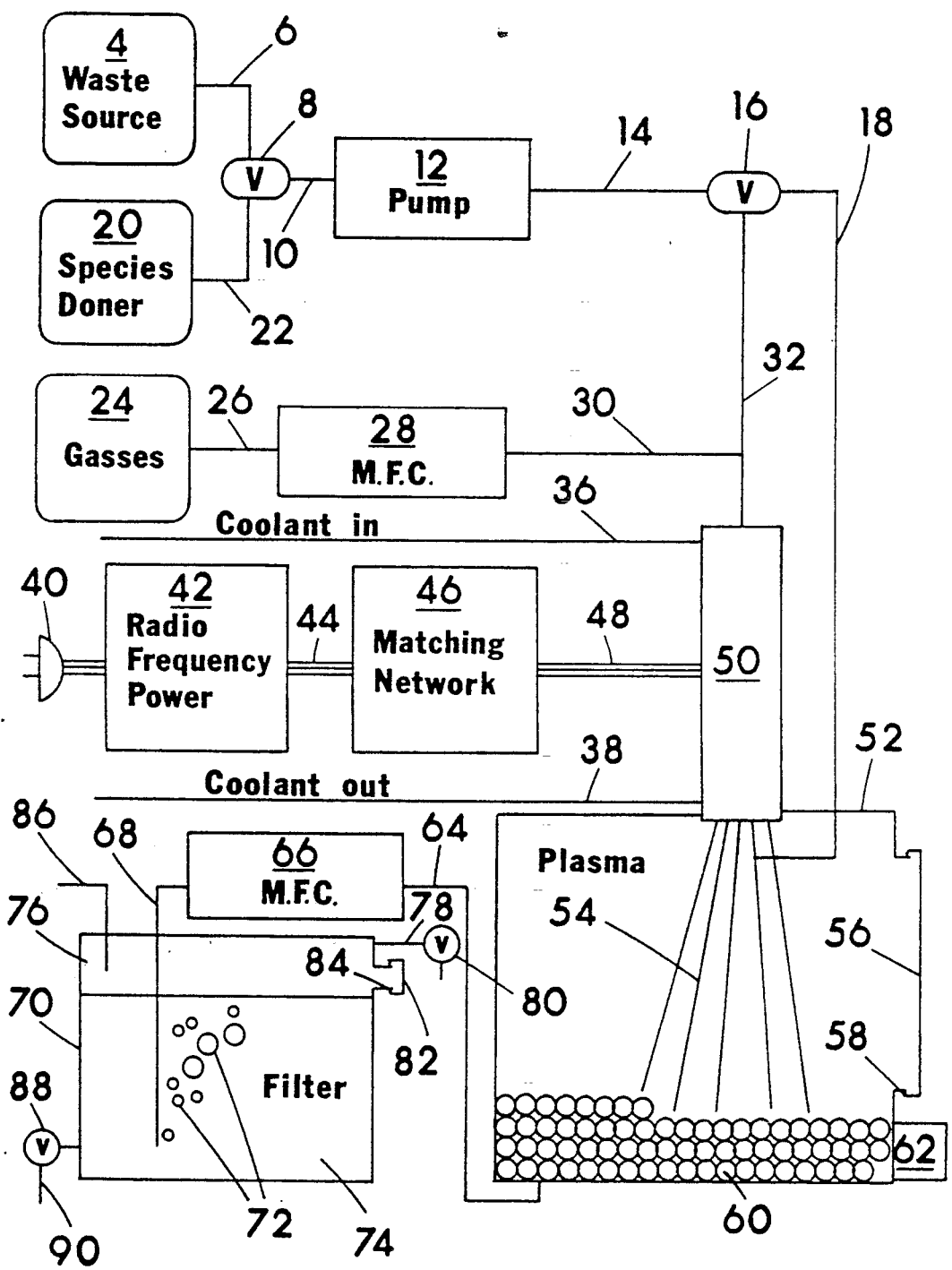

United States Patent [19]

Poovey

[11] Patent Number: 5,134,946
[45] Date of Patent: Aug. 4, 1992

[54] NEUTRALIZER FOR TOXIC AND NUCLEAR WASTE

[76] Inventor: Gary N. Poovey, 1244 St. Francis Dr., Manteca, Calif. 95336

[21] Appl. No.: 733,338

[22] Filed: Jul. 22, 1991

[51] Int. Cl.[5] ............................................... F23G 7/04
[52] U.S. Cl. .................................... 110/346; 110/250; 110/237; 422/186
[58] Field of Search ............... 110/237, 235, 346, 250; 422/186

[56] References Cited

U.S. PATENT DOCUMENTS

| | | |
|---|---|---|
| 3,401,302 | 9/1968 | Thorpe et al. |
| 4,376,598 | 3/1983 | Brouns et al. |
| 4,644,877 | 2/1987 | Barton et al. |
| 4,770,109 | 9/1988 | Schlienger ...................... 110/250 X |
| 4,909,164 | 3/1990 | Sitohet et al. ........................ 110/346 |
| 5,010,829 | 4/1991 | Kulkarni ............................. 110/346 |

OTHER PUBLICATIONS

B. C. Sales & L. A. Boatner, "Lead Phosphate Glass as a Stable Medium for the Immobilization and Disposal of High-Level Nuclear Waste" May 1984, pp. 301 to 304, Magazine *Materials Letters*.

*Primary Examiner*—Edward G. Favors

[57] ABSTRACT

A method and apparatus are disclosed wherein toxic and nuclear waste are pumped in a metered fashion or introduced through a sealing door into a plasma region. The plasma region is generated in a sealed chamber by a radio frequency plasma torch. In the plasma region the toxic waste is atomized and ionized. The recombining of the atomized and ionized molecules is managed in the sealed reaction chamber to yield environmentally neutral products. Encapsulation material that is either introduced into the process chamber with the waste or is resident in the process chamber encapsulates radioactive or heavy metal atoms in a glassy stone like material. This encapsulating renders the atoms environmentally neutral. The flow of material in and out of the reaction chamber are regulated carefully. The radio frequency power level is also carefully controlled. These controls insure the neutrality of the recombining products. The fluids exiting the chamber are filtered before release, to insure environmental neutrality.

20 Claims, 1 Drawing Sheet

10

NEUTRALIZER FOR TOXIC AND NUCLEAR WASTE

BACKGROUND OF THE INVENTION

1. Field of the Invention

This invention relates to methods and apparatuses for rendering toxic and nuclear waste environmentally neutral.

2. Description of Prior Art

The E.P.A. and other government agencies have compiled long lists of chemicals that are hazardous to the environment and mankind. These hazardous wastes have organic and inorganic components, in addition to this there are radioactive wastes. The E.P.A. and other organizations have compiled lists of sites contaminated with these wastes. Many times the soil of the site has been contaminated. The E.P.A. licenses incinerators to dispose of these contaminated soils. The incineration of soil contaminated with organic wastes is not cost effective because of the fuel that must be mixed with it. Incineration methods of waste disposal produce carbon dioxide, water, and always some poisonous dioxin. These products are produced because incineration is an oxidizing process. Electrically generated plasma affords a reducing chemistry that will not produce dioxin when handling PCB's. Plasma torch devices like that of U. S. Pat. No. 4,644,877 issued to T. G. Barton and E. S. Fox on Feb. 24, 1987 which teaches "PLASMA PYROLYSIS WASTE DESTRUCTION", will successfully breakdown halogenated organics like PCB, which is incorporated herein by reference. These describe the reaction as pyrolytic atomization and ionization. The plasma breaks the chemical bonds of and ionizes the atoms in the toxic waste molecules. This makes it possible to control the recombining of these atoms to effect the desired neutralization. The plasma devices that deal with halogenated organic wastes like PCB recombine the carbon into methane. They recombine the halogens into salts. Before plasma related methods of toxic waste disposal incineration had been the most promising method even though they produced dioxin. Plasma methods are now the most promising method even though the direct current (not oscillating current) plasma torches that they use require costly and hazardous changing of eroded electrodes. These do not handle heavy metal or nuclear waste or waste mixed in soils. A U. S. patent, U. S. Pat. No. 4,376,598 issued to R. A. Brouns et al., on Mar. 15, 1983 teaches "IN-SITU VITRIFICATION OF SOIL". The Brouns et al disclosure is directed toward the use of two or more conductive electrodes which are inserted into soil for heating the soil mass to above its melting temperature to immobilize waste within the soil. The Brouns equipment suffers leakages of dangerous gasses. The Brouns equipment has difficulty producing a uniform end product which makes final disposal problematic.

SUMMARY OF INVENTION

The present invention will reduce organic toxic wastes into single carbon modecules like methane and salt solutions with out producing dioxin. This renders the organic toxic wastes environmentally neutral. This is as Barton and Fox teach in their "PLASMA PYROLYSIS WASTE DESTRUCTION" U.S. Pat. No. 4,644,877 which is herein incorporated by reference, but the present invention will handle waste containing heavy metals, nuclear wastes and contaminated soils. The heavy metal and nuclear waste atoms are incorporated into glass or stone like material that will not release into the air or leach into water or absorb into any other solid. This renders them environmentally neutral. An article published on pages 301 to 304 of the magazine MATERIALS LETTERS in May of 1984 entitled "Lead Phosphate Glass as a Stable Medium for the Immobilization and Disposal of High-Level Nuclear Waste" written by B. C. Sales and L. A. Boatner discusses encapsulation as a means of rendering nuclear waste environmentally neutral. The present invention deals with nuclear waste in this way. Sales and Boatner use a flame to melt their lead phosphate glass. My NEUTRALIZER FOR TOXIC AND NUCLEAR WASTE uses a plasma torch to melt the encapsulating material. The present invention will economically deal with the hardest waste to dispose of, contaminated soils. The present invention uses a radio frequency (oscillating current) plasma torch. A U.S. Pat. No. 3,401,302 issued to M. L. Thorpe et al., on Sep. 10, 1968 teaches "INDUCTION PLASMA GENERATOR INCLUDING COOLING MEANS, GAS FLOW MEANS, AND OPERATING MEANS THEREFOR" shows a radio frequency plasma torch. This plasma torch does not have eroding electrodes that must be changed periodically. The present invention uses an induction plasma torch like that of M. L. Thorpe et al., athough it is not, per se, considered to be part of the present invention. This avoids the hazardous and costly changing of electrodes. The present invention will accept soils contaminated with organic, heavy metal, or nuclear waste and needs no expensive fuel oil to be added to it. The present invention fuses soils in a sealed chamber so no leaks of poison gas can occur. The present invention incorporates an agitator for the bed of encapsulating material in the chamber to insure that a uniform encapsulated product that will make final disposal easy. In the present invention, process controls are used to drive the reaction toward products that are useful. The sale of these products will further reduce the cost of processing toxic waste.

DESCRIPTION OF FIG. 1

FIG. 1 is a schematic diagram of one possible arrangement of my NEUTRALIZER FOR TOXIC AND NUCLEAR WASTE.

BEST MODE FOR CARRYING OUT THE INVENTION

Toxic or nuclear waste is drawn from a waste source 4 to be neutralized. The waste may have added to it an encapsulating material so that when it passes through a plasma torch 50 the desired neutralization may be accomplished. Waste source 4 can be internal to the equipment or external to it with a pipe 6 by which the waste is drawn to a valve 8 by a pump 12. Pump 12 is a flexible hose with a pinching cam type pump. In the case of heavy sludge waste it is a diaphragm pump. With gaseous waste pump 12 is a compressor. Valve 8 allows waste to be drawn by pump 12. Valve 8 allows various mixtures of waste and reactive species donor sources material to be chosen. The reactive species donor source 20 may be either internal or external to the equipment. Reactive species donor source 20 may contain encapsulating material. This encapsulating material can be run through the plasma torch after valve 8 has been set to only allow material to be drawn from source 20. This procedure allows a coating of encapsulating material that is free of waste atoms to be applied over the stone like pieces of encapsulated waste. This procedure makes the encapsulated waste safer to handle. A valve 16 allows material pumped by pump 12 to be directed through plasma torch 50 via a pipe 32 or into a reaction chamber 52 via a pipe 18. A flow of carrier gasses from a source of carrier gasses 24 through pipe 26 is regulated by a mass flow controller (M.F.C.) 28 into pipe 30. Pipe 30 feeds materials directly through the center of plasma torch 50. Pipe 30 and 32 connect together to send materials through the center of plasma torch 50. Plasma torch 50 is cooled by coolant brought to it via a pipe 36. The hot coolant leaves the plasma torch via a coolant pipe 38. An electrical plug and chord 40 supply power to a radio frequency power (R.F. power) generator 42. R.F. power generator 42 supplies an current of electricity that oscillates between 10,000 times a second and 70,000,000 times a second. Current that oscillates 100,000 times a second is used effectively. The power level necessary for the desired environmental neutralization is between 10 and 100 kilo watts for a mole per minute of waste flow. The R.F. power is directed to a radio frequency matching network (R.F. match) 46 via coaxial cable 44. The R.F. match 46 regulates the phase of the current and voltage of the R.F. power so the maximum power is delivered to the plasma torch 50 through a coaxial cable 48. In reaction chamber 52, a plasma region 54 is generated by plasma touch 50. Plasma region 54 may be allowed to terminate in the space of the chamber or in an alternative method a bed of chunks of encapsulating material 60 may be put in the way of plasma torch 50. Plasma region 54 thus being made to play on the bed of chunks of encapsulating material 60. The bed of chunks of encapsulating material 60 may cover the bottom of reaction chamber 52. The encapsulating material is a silicon rich or boron rich material. Other encapsulating materials are rich in aluminum oxide or chemicals present in certain rocks. In an alternative configuration, one or more of the other inside surfaces of the chamber may be covered with an encapsulating material in liquid or solid form. The solid could be in a monolithic piece or chunks or powder. A sealing chamber door 56 covers the opening of reaction chamber 52 that allows waste material to be placed on the bed of chunks of encapsulating material 60. Sealing chamber door 56 is sealed air tight by seal 58. Sealing chamber door 56 can seal by pressure on a rubberized seal or screwing on or clamping or other sealing method. The bed of chunks of encapsulating material 60 is agitated by a encapsulating material agitator 62. Many possible ways to agitate the chunks of encapsulating material can be used, such as a vibrator or a motorized table. A vibrator shakes the chunks of encapsulating material so that new sides of the chunks receive the deposition of materials vaporized by plasma torch 50. Pipes 18,32,36,38, and 64 have a piece of flexible pipe connecting the reaction chamber 52 to allow the reaction chamber 52 to vibrate as agitator 62 works. An alternative to vibrating the whole chamber is to have a motorized table that tumbles and moves the chunks of encapsulating material around as they receive deposition of the material vaporized by plasma torch 50. Fluids (gas or liquid) exit reaction chamber 52 via a pipe 64. A mass flow controller 66 regulates the flow through pipe 64 into pipe 68. Fluid filtration system 70 will be most effective for some wastes when the fluid material 74 is water. When other wastes are processed the fluid material 74 must be an alkaline solution. A five molar solution of sodium hydroxide is typical. Bubbles of gas 72 separate to the top of fluid filtration system 70. Exiting gas 76 is collected at the top of fluid filtration system 70 where pipe 86 can conduct it out of the equipment. Valve 80 allows fresh water to be added to fluid filtration system 70 via pipe 78. Sealing door 82 allows materials other than water to be added to fluid filtration system 70 as they are needed to maintain the quality of the functioning of the filter. Sealing door 82 is sealed by seal 84. Seal 84 is accomplished by clamping on a rubberized member. Valve 88 allows safely sewerable fluids from fluid filtration system 70 to be drained from the equipment through pipe 90. The drawing of the NEUTRALIZER FOR TOXIC AND NUCLEAR WASTE is a schematic drawing. In an actual installation, additional valves, additional pressure sensors, additional flow sensors, and other usual process control components would be used.

PLASMA REACTION

Plasma devices such as the present invention take advantage of the conditions in the fourth state of matter plasma. A plasma is a gaseous state with a constant supply of ionized atoms. The high energy ions and electrons in the plasma region will atomize materials passing through the plasma region. Once the wastes are atomized their recombining is controlled so that the resulting molecules are environmentally neutral. In the example of PCB's, the result is methane and salt water. In addition to the PCB process just mentioned, the present invention incorporates a bed of chunks of encapsulating material 60. Bed of chunks of encapsulation material 60 is a template for the deposition of cooling plasma products. By the action of encapsulating material agitator 62 uniform chunks of glassy stone like material that can be made to form around toxic atoms. Some wastes may require encapsulating material to be mixed with it before it is fed into the plasma region 54. This is be done in waste source 4. Soils contaminated with hazardous waste usually will have enough silicon, boron, and aluminum to form a glassy stone like chunk once it is heated by the plasma. Such wastes do not require any encapsulating material to be added to them for the desired environmental neutralization to be accomplished. The present invention renders toxic materials with heavy metals in them environmentally neutral by encapsulating the heavy metal atoms in a glassy stone like material. This encapsulation that keeps them from leaching into soil or evaporation into air or dissolve into water. This is also the case for radio active atoms. Making these atoms inaccessible to the environment, is what is meant by environmentally neutral. Reaction chamber 52 allows the control of the recombining of the atomized plasma products by containing the plasma reaction. Plasma region 54 can be directed into reaction chamber 52 so that it does not play upon the bed of encapsulating material 60. Plasma region 54 can terminate in the center of reaction chamber 52 so that hazardous waste can be processed with out involvement of other constituents. Control of the chamber process allows useful products to be produced. Such useful products may include methane or acetylene.

CHAMBER PROCESS CONTROL

Pump 12 controls the flow of the waste into the sealed reaction chamber 52. Mass flow controller 28 controls the flow of the carrier gasses into plasma torch 50 that issues these gasses and other things fed through it in plasma form into reaction chamber 52. Mass flow controller 66 controls the flow of products out of the chamber. Reactive species donor source 20 stores donor material that when it is ionized it donates reactive chemical species to the chemical process. Valve 8 allows a mixture of waste and species donor material to be fed onto the plasma. With this control of material quality and quantity flowing in and out of the chamber, it is only necessary to control the temperature of sealed reaction chamber 52 to have control of the pressure in the chamber. A radio frequency generator 42, by putting energy into the chamber via plasma torch 50, heats reaction chamber 52. So the temperature of the chamber is controlled by setting the power level of radio frequency generator 42. With these process controls in place, the thermodynamic potential enthalpy of the process products can be controlled so that useful byproducts of reaction may be produced. Methane, ethane, and acetylene are examples of useful products.

WASTE PATH TO PLASMA REGION

The Plasma torch 50 generates the plasma by the influence of radio frequency energy on an induction coil. Plasma torches using induction have no electrodes that erode as do direct current plasma torches. Pipe 32 and pipe 18 in combination with valve 16 allow waste to be directed into the plasma region 54 in two different ways. Pipe 18 allows waste to be pumped into the plasma region with out passing through the center of the plasma torch 50. Pipe 32 conducts waste through the center of the plasma torch 50. The most effective path for a particular waste to be neutralized can be chosen. A further path into the plasma region is through sealing chamber door 56 which allows waste to be put into the chamber for the plasma to play upon it until it is rendered environmentally neutral. Boxes of hospital waste are dealt with effectively this way.

PLASMA TORCH

The plasma torch 50 is supplied coolant by coolant pipe 36. The warm coolant exits plasma torch 50 by coolant pipe 38. The plasma torch 50 is supplied radio frequency energy by coaxial cable 48. Radio frequency matching network 46 controls the phase difference between the voltage and current waves of the radio frequency energy. This is done so that the least power is wasted during its delivery to plasma torch 50 by coaxial cable 48. Radio frequency generator 42 produces the radio frequency power for plasma torch 50. Electrical currents oscillating at 100,000 cycles per second and 13,560,000 cycles per second are commonly used to generate plasmas. Elecltrical plug and cable 40 supplies electrical power to the radio frequency generator 42. The plasma torch is supplied sufficient energy to ionize and atomize sufficient amounts of the materials fed trough it to ensure the desired environmental neutralization of waste material. The construction of the plasma torch 50 is not considered to be part of the present inventin. However, radio frequency plasma torches made by Hobart Tafa Technologies Incorporated, 146 Pembroke Rod, Concord, New Hampshire, 03301-1157, U.S.A., fulfill the requirements of this invention's specifications. The construction of these follow U.S. Pat. No. 3,401,302 issued to M. L. Thorpe et al., on Sep. 10, 1968. Witch teaches "INDUCTION PLASMA GENERATOR INCLUDING COOLING MEANS, GAS FLOW MEANS, AND OPERATING MEANS THEREFOR".

ENTRANCE AND EXIT OF MATERIALS

Waste source 4 can be external to the equipment or internal. If waste source 4 is external to the equipment, then pipe 6 will extend out of the equipment to connect waste source 4 to valve 8. Reactive species donor source 20 supplies material chemically useful to the plasma process, and it may be internl or external to the equipment. Source of carrier gasses 24 supplies the carrier gas or gasses that are made to flow through plasma torch 50. It may be internal or external to the equipment. Chamber exit pipe 64 carries the fluids (gas and liquid) products from reaction chamber to filtration system 70. Elements of filtration system 70 that must be replaced can be put into reaction chamber 52 to be processed. Any piece of the apparatus that has become contaminated with toxic or radioactive waste can be placed in reaction chamber 52 to be processed. This is done so that no environmental hazard will be generated by the present invention. Finally a pipe 86 carries environmentally neutral gasses from the equipment. When the waste is broken down into methane or acetylene these can be burned in air or bottled and sold.

ENCAPSULATION

Encapsulation is necessary to render Heavy metal and radioactive atoms environmentally neutral, for these atoms do not brake down in a plasma as P.C.B. molecules do. The present invention vaporizes the toxic waste containing heavy metal and radioactive atoms and deposits these atoms in a glassy rock like material. The heavy metal atoms and radioactive atoms are trapped in the molecular bonds of the glassy rock like material. Thus trapped, the toxic or radioactive atoms cannot evaporate into the air or dissolve into the water or leach in to the soil. This takes them out of interaction with the environment so they are rendered environmentally neutral. Heavy metals vaporized in the plasma torch will deposit on hot metallic surfaces. That is metal surfaces that are at 130 to 5000 degrees centigrade depending on the gasses present in the chamber during the deposition. This is true for metallic radioactive atoms too. Nonmetallic radioactive atoms deposit on cool nonmetallic surfaces. The encapsulating material will be hot enough where the plasma plays upon it to cause the metallic atoms to deposit. The encapsulating material far from the plasma region will be cool enough to receive the nonmetal atom deposition. Encapsulation material that is vaporized by the plasma will deposit over the waste atoms and trap them in the glassy stone like chunks formed in the chamber. As a processing run proceeds the glassy stone like chunks that receive the deposition of toxic or radioactive atoms are increasing in size by taking on more glassy stone like material. This embeds the toxic atoms in the inner layers of these chunks. The material that is needed to them that is not from the waste is encapsulating material from reactive species donor source 20, or alternatively from the soil that the toxic or radioactive waste is in. The encapsulating material agitator 62 ensures the uniformity of the product chunks that receive the deposition in the chamber bottom. At the end of a processing run the flow of waste will be stopped and more encapsulating material deposited, so the uniform chunks produced will have no toxic or radioactive atoms on their outer surfaces.

What I claim as my invention is:

1. A method for rendering toxic and nuclear waste environmentally neutral comprising the steps of:
   (a) feeding waste material into a plasma region;
   (b) introducing waste material into said plasma region which is sufficiently hot to vaporize enough of said waste materials fed into said plasma region to insure that said environmental neutralization is accomplished, to be ionized and atomized in a process chamber, said plasma region is generated by a radio frequency plasma torch;
   (c) managing the recombining of said ionized and atomized waste material by managing said process chamber chemistry, pressure, and temperature, through mass flow control means all materials entering and exiting said process chamber, and by controlling flow of radio frequency energy into said process chamber through said radio frequency plasma torch;
   (d) filtering fluids exiting said chamber to insure environmental neutrality.

2. A method as claimed in claim 1, wherein said waste can be introduced three ways into said plasma region:
   (a) through said plasma torch's center,
   (b) through injection into said plasma region,
   (c) and being placed on a bed of encapsulating material through a sealing door in said reaction chamber, that said plasma region can be made to play on.

3. A method as claimed in claim 1, wherein methane and other low molecular weight gasses exiting said reaction chamber may be safely used as fuel.

4. A method as claimed in claim 1, wherein in said reaction chamber pressure is controlled to drive the recombining reactions occurring in said reaction chamber toward products that may be desired for their economic value by controlling flow of materials and flow of heat and radio frequency power in and out of said reaction chamber.

5. A method as claimed in claim 1, wherein materials that are nonhazardous may be fed into said plasma reaction to contribute reactive species to said reaction once they are ionized.

6. A method as claimed in claim 1, wherein heavy metal and radioactive wastes are incorporated into a glassy stone like material, by supplying to the reaction chamber with encapsulation material to form the glassy stone like material.

7. A method as claimed in claim 6, wherein said encapsulation material may be fed into said reaction chamber three ways:
   (a) through said plasma torch's center,
   (b) through injection into said plasma region,
   (c) and being placed on said bed of encapsulating material through said sealing door in said reaction chamber, that said plasma can be made to play on.

8. A method as claimed in claim 1, wherein toxic and nuclear waste contaminated soils may be admitted to said process chamber to be reduced to an environmentally neutral glassy stone like material and environmentally neutral gasses and safely sewerable liquids, where by encapsulation may be accomplished by rock like chemicals resident in said soil.

9. A method as claimed in claim 1, wherein said filtering material in said exiting filter may be fed into said reaction chamber to be rendered environmentally neutral.

10. A method as claimed in claim 1, wherein chunks of encapsulating material in said bed of encapsulating material receive deposition and encapsulated toxic and nuclear waste atoms on their surface when they are heated sufficiently.

11. A method as claimed in claim 1, wherein chunks of encapsulating material in said bed of encapsulating material receive deposition and encapsulated toxic and nuclear waste atoms on their surface when cool.

12. A method as claimed in claim 1, wherein encapsulating materials can be mixed with certain toxic wastes to properly process them.

13. A method as claimed in claim 1, wherein materials that are nonhazardous may be fed into said plasma reaction to contribute reactive species to said reaction once they are ionized.

14. An apparatus for plasma processing of waste materials, said apparatus comprising:
   (a) a radio frequency inductive plasma torch, and means for cooling said plasma torch, for the production of a plasma region which is sufficiently hot to vaporize enough of said waste materials fed into said plasma torch to insure that environmental neutralization is accomplished;
   (b) a radio frequency generator, and a matching network to supply radio frequency energy to said plasma torch in a monitored and metered fashion;
   (c) a reaction chamber, the floor of which is covered with a bed of encapsulating material, connected to said plasma torch in which said plasma reaction will take place including a sealing door through which waste materials are put into the chamber;
   (d) means for metering and monitoring materials entering and exiting said reaction chamber;
   (e) a filter for filtering the fluids exiting said reaction chamber.

15. An apparatus as claimed in claim 14, wherein waste material may be inserted into said plasma through said radio frequency induction torch's center.

16. An apparatus as claimed in claim 14, wherein waste material may be inserted into said plasma region without passing through said plasma torch.

17. An apparatus as claimed in claim 14, wherein waste material may be brought into said plasma region on said bed of encapsulating material through said sealing door where said plasma region will play upon it.

18. An apparatus as claimed in claim 14, wherein a means of agitating said bed of encapsulating material is employed so that uniform sized product chunks are produced.

19. An apparatus as claimed in claim 14, wherein said plasma region may terminate without being in contact with a bed of encapsulating material whereby gaseous toxic waste may be neutralized without involvement of other constituents.

20. An apparatus as claimed in claim 14, wherein a means of process control comprising:
   (a) a means of controlling flow rates of materials in and out of said reaction chamber,
   (b) a means of controlling radio frequency power flow and heat flow in and out of said reaction chamber,
   (c) a means of controlling chemical constituency rate of change of said reaction chamber,
   (d) a means of controlling said reaction chamber pressure and enthalpy, whereby environmental neutralization occurs and whereby useful products may be produced.

* * * * *